United States Patent
Kumar et al.

(10) Patent No.: US 12,490,070 B2
(45) Date of Patent: Dec. 2, 2025

(54) APPARATUS AND METHOD FOR HANDLING DEREGISTRATION PROCEDURE OF USER EQUIPMENT FOR DISASTER ROAMING SERVICE IN WIRELESS NETWORK

(71) Applicant: SAMSUNG ELECTRONICS CO., LTD., Suwon-si (KR)

(72) Inventors: Lalith Kumar, Bangalore (IN); Aman Agarwal, Bangalore (IN); Samiran Bhowmik, Bangalore (IN); Kailash Kumar Jha, Bangalore (IN); Mahmoud Watfa, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/003,861

(22) PCT Filed: May 17, 2022

(86) PCT No.: PCT/KR2022/007058
§ 371 (c)(1),
(2) Date: Dec. 29, 2022

(87) PCT Pub. No.: WO2022/250362
PCT Pub. Date: Dec. 1, 2022

(65) Prior Publication Data
US 2023/0370829 A1    Nov. 16, 2023

(30) Foreign Application Priority Data

May 23, 2021    (IN) .............................. 202141022965
May 12, 2022    (IN) .............................. 202141022965

(51) Int. Cl.
*H04W 4/90*      (2018.01)
*H04W 4/40*      (2018.01)
(Continued)

(52) U.S. Cl.
CPC ............... *H04W 4/90* (2018.02); *H04W 4/40* (2018.02); *H04W 60/06* (2013.01); *H04W 76/50* (2018.02)

(58) Field of Classification Search
CPC ......... H04W 4/90; H04W 48/18; H04W 8/06; H04W 76/50; H04W 60/06; H04W 48/08
See application file for complete search history.

(56) References Cited

U.S. PATENT DOCUMENTS

2009/0186594 A1*   7/2009   Kang ..................... H04W 76/50
                                                        455/404.1
2009/0264095 A1*   10/2009   Khetawat .............. H04W 92/12
                                                        455/404.2

(Continued)

FOREIGN PATENT DOCUMENTS

JP        2021502037 A      1/2021
WO     2019122494 A1     6/2019
(Continued)

OTHER PUBLICATIONS

Office Action dated Dec. 8, 2022 in connection with India Patent Application No. 202141022965, 8 pages.
(Continued)

*Primary Examiner* — Dung Hong

(57) ABSTRACT

The disclosure relates to a 5G or 6G communication system for supporting a higher data transmission rate. Embodiments herein disclose a method for handling a deregistration procedure of a UE (100) for a disaster roaming service in a wireless network (1000) by the UE (100). The method includes detecting a disaster condition in the wireless network (1000). Further, the method includes triggering a registration procedure with a forbidden PLMN (FPLMN) on a 3GPP access to receive the disaster roaming service in the wireless network (1000) and get registered for the disaster roaming service with the FPLMN (300). Further, the method includes detecting a signal on a non-3GPP access to receive a normal service. Further, the method includes triggering a
(Continued)

deregistration procedure with the FPLMN (300) on the 3GPP access to stop receiving the disaster roaming service from the FPLMN (300) in response to detecting the signal on the non-3GPP access to receive the normal service.

12 Claims, 12 Drawing Sheets

(51) Int. Cl.
*H04W 60/06* (2009.01)
*H04W 76/50* (2018.01)

(56) References Cited

U.S. PATENT DOCUMENTS

| | | | | |
|---|---|---|---|---|
| 2012/0236760 | A1* | 9/2012 | Ionescu | H04L 65/1069 370/259 |
| 2012/0289180 | A1* | 11/2012 | Bourdu | H04W 4/021 455/404.1 |
| 2018/0139788 | A1* | 5/2018 | Jhunjhunwala | H04W 76/50 |
| 2020/0267539 | A1 | 8/2020 | Tamura et al. | |
| 2021/0306849 | A1 | 9/2021 | Liu | |
| 2021/0368421 | A1* | 11/2021 | Venkataraman | H04W 76/11 |
| 2022/0070815 | A1* | 3/2022 | Chun | H04W 8/02 |
| 2022/0272651 | A1* | 8/2022 | Chun | H04W 60/06 |
| 2023/0156122 | A1* | 5/2023 | Buechter | H04L 65/1069 455/404.1 |
| 2023/0156863 | A1* | 5/2023 | Park | H04W 48/18 455/404.1 |
| 2024/0007878 | A1* | 1/2024 | Starsinic | H04W 4/06 |
| 2024/0080791 | A1* | 3/2024 | Aghili | H04W 60/005 |
| 2024/0098676 | A1* | 3/2024 | Chun | H04W 48/18 |
| 2024/0121572 | A1* | 4/2024 | Ramachandran | H04W 4/021 |

FOREIGN PATENT DOCUMENTS

| | | | |
|---|---|---|---|
| WO | 2020030851 | A1 | 2/2020 |
| WO | 2020218764 | A1 | 10/2020 |
| WO | 2021020933 | A1 | 2/2021 |

OTHER PUBLICATIONS

Supplementary European Search Report dated Oct. 24, 2023, in connection with European Patent Application No. 22811555.6, 9 pages.
International Search Report and Written Opinion of the International Searching Authority dated Aug. 18, 2022 in connection with International Application No. PCT/KR2022/007058, 7 pages.
Intellectual Property India, "Examination Report under sections 12 13 of the Patents Act," dated Dec. 8, 2022, in connection with Indian Patent Application No. 202141022965, 8 pages.
3GPP TS 24.501 V17.2.1 (Apr. 2021); Technical Specification; 3rd Generation Partnership Project; Technical Specification Group Core Network and Terminals; Non-Access-Stratum (NAS) protocol for 5G System (5GS); Stage 3; (Release 17); 756 pages.
3GPP TS 31.111 V16.4.0 (Mar. 2021); Technical Specification; 3rd Generation Partnership Project; Technical Specification Group Core Network and Terminals; Universal Subscriber Identity Module (USIM) Application Toolkit (USAT) (Release 16); 162 pages.
3GPP TS 23.122 V17.2.0 (Mar. 2021)Technical Specification; 3rd Generation Partnership Project; Technical Specification Group Core Network and Terminals; Non-Access-Stratum (NAS) functions related to Mobile Station (MS) in idle mode (Release 17); 94 pages.
3GPP TR 24.811 V1.1.0 (Apr. 2021) Technical Report; 3rd Generation Partnership Project; Technical Specification Group Core Network and Terminals; Study on the support for minimization of service interruption;(Release 17) 99 pages.
LG Electronics, "Summary of the moderated e-mail discussion on FS_MINT-CT," 3GPP TSG-CT WG1 Meeting #129-e, C1-212334, 31 pages.
Vivo, "MINT: Conclusions for KI#6," 3GPP TSG-CT WG1 Meeting #129-e C1-212269, 2 pages.
InterDigital, "KI#4: Disaster inbound roamer Registration using a Disaster Response Function (DRF)," 3GPP TSG-CT WG1 Meeting #128-e, C1-211370, 4 pages.
Communication pursuant to Article 94(3) EPC dated Jun. 3, 2025, in connection with European Application No. 22811555.6, 4 pages.

* cited by examiner

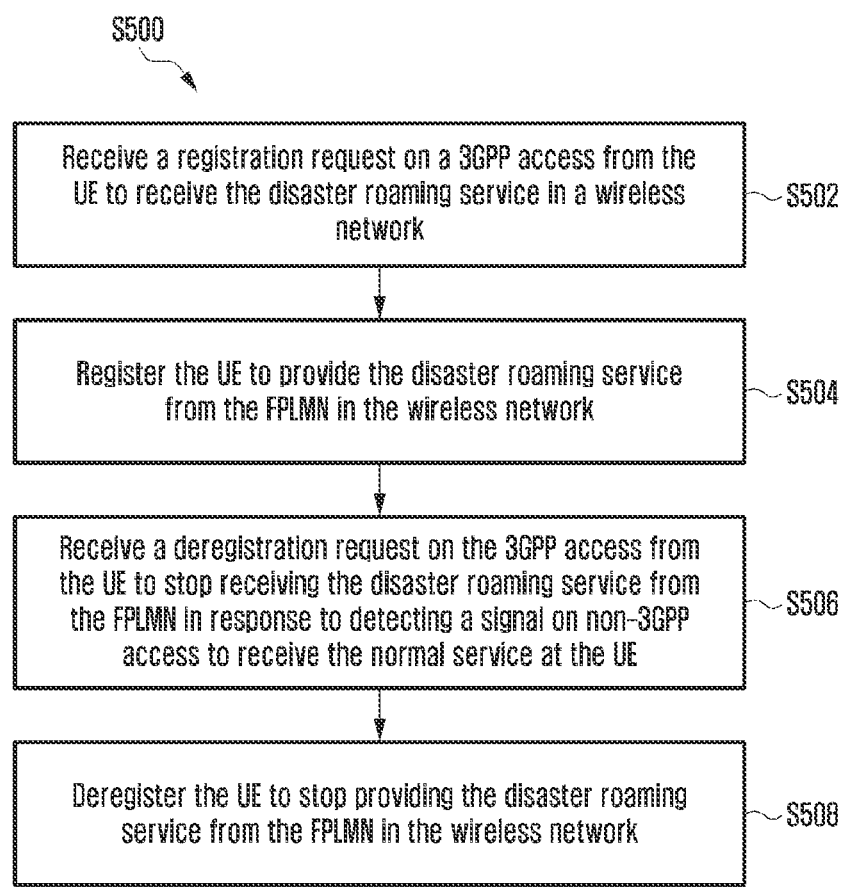

APPARATUS AND METHOD FOR HANDLING DEREGISTRATION PROCEDURE OF USER EQUIPMENT FOR DISASTER ROAMING SERVICE IN WIRELESS NETWORK

CROSS-REFERENCE TO RELATED APPLICATIONS

This application is a 371 of International Application No. PCT/KR2022/007058 filed on May 17, 2022, which claims priority to Indian Patent Application No. 202141022965 filed on May 23, 2021, and Indian Patent Application No. 202141022965 filed on May 12, 2022, the disclosures of which are herein incorporated by reference in their entirety.

BACKGROUND

1. Field

Embodiments disclosed herein relate to wireless networks, and more particularly to methods and systems for handling a deregistration procedure of a user equipment (UE) for a disaster roaming service in the wireless networks. This application is based on and derives the benefit of Indian Provisional Application 202141022965 filed on 23 May, 2021, the contents of which are incorporated herein by reference.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The purpose of MINT (Minimization of Service Interruption) is to minimize interruption of a service to users when a wireless network to which these users are subscribed cannot provide the service due to a disaster such as e.g., a fire, an earthquake or the like by enabling the users of the UE to obtain service on other networks, while at the same time protecting those other networks from congestion.

Consider that the PLMN D is subject to the disaster and the PLMN A is alive and not subject to disaster but is a forbidden PLMN to the UE in this embodiment. The terms disaster based service and disaster roaming service have used interchangeably herein and have the same meaning in the disclosure.

FIG. 1 and FIG. 2 illustrates a sequence diagram of a method for handling a deregistration procedure of the UE (100) for a disaster roaming service in a wireless network (1000), according to prior arts.

Referring to the FIG. 1, the disaster roaming service is very costly service. Because this is provided by forbidden PLMN (300) (let's call PLMN-A). Also, the UEs (100) gets low priority treatment from the PLMN-A (FPLMN), because FPLMN would prioritize its own subscribers and not all the services might be received. At 1, Consider, the UE (100) is registered for the disaster roaming service on the 3GPP access over the FPLMN (300). At 2, the UE (100) finds the non-3GPP access signal and registers on non-3GPP access to receive normal services. As per prior art, the UE (100) continuous to the receive disaster roaming services over 3GPP access on forbidden PLMN (300). As per prior art the UE (100) receiving normal service over non-3GPP access have no dependency for the actions of the UE over 3GPP access, due to which the UE end up registered for disaster roaming service and can continue to be costly for the HPLMN operator. Referring to the FIG. 2, At 1, the PLMN-1 faces the disaster condition. At 2, the PLMN-1 indicates that the PLMN-1 is in disaster condition to the FPLMN (300). The FPLMN (300) broadcasts that the PLMN-1 is in the disaster condition. At 3, after seeing the broadcasts from the FPLMN (300), the UE (100) detects that there is disaster condition on the PLMN-1. At 4, the UE (100) registers with the FPLMN to receive the disaster roaming service. At 5, after sometime, the PLMN-1 disaster condition ends. At 6, the PLMN-1 indicates disaster condition has ended thus request to move all the UEs (PLMN-1s subscribers) back to PLMN-1 to FPLMN.

SUMMARY

According to the prior arts, ideally the FPLMN (300) should indicate to UEs (100) that the disaster situation has ended due to which UEs will go back to PLMN-1. But, the FPLMN (300) acts maliciously never indicate to the UE (100) that the disaster condition has ended. The UE (100) continue to receive services from the FPLMN (300) due to which revenues of FPLMN increases impacting HPLMN and PLMN-1 revenue and user services also impacted.

Solution to Problem

The principal object of the embodiments herein is to disclose a method, a UE, a HPLMN, a VPLMN and a FPLMN for handling a deregistration procedure of the UE for a disaster roaming service in a wireless network. Accordingly, the embodiments herein provide a method a UE operations during a disaster situation in a wireless network. The method includes detecting, by the UE, a disaster condition in the wireless network. Further, the method includes triggering, by the UE, a registration procedure with a forbidden PLMN (FPLMN) on a 3GPP access to receive the disaster roaming service in the wireless network and get registered for the disaster roaming service with the FPLMN. Further, the method includes detecting, by the UE, a signal on a non-3GPP access to receive normal service. Further, the method includes triggering, by the UE, a deregistration procedure with the FPLMN on the 3GPP access to stop receiving the disaster roaming service from the FPLMN in response to detecting the signal on the non-3GPP access to receive the normal service.

In an embodiment, triggering the deregistration procedure with the FPLMN on the 3GPP access includes determining whether the UE is able to register to PLMN on the non-3GPP access to receive the normal service based on the signal, triggering a registration procedure with the PLMN on the non-3GPP access to receive the normal service in the wireless network, determining whether the registration procedure with the PLMN on the non-3GPP access to receive the normal service in the wireless network is successful, and triggering a deregistration procedure with the FPLMN on the 3GPP access to stop receiving the disaster roaming service from the FPLMN in response to determining that the registration procedure with the PLMN on the non-3GPP access to receive the normal service in the wireless network is successful.

In an embodiment, the FPLMN provides services to the UE during the disaster condition in the wireless network (1000)

Accordingly, the embodiments herein provide a method a UE operations during a disaster situation in a wireless network. The method includes receiving, by a FPLMN, a registration request on a 3GPP access from the UE to receive the disaster roaming service in the wireless network. Further, the method includes registering, by the FPLMN, the UE to provide the disaster roaming service from the FPLMN in the wireless network. Further, the method includes receiving, by the FPLMN, a deregistration request on the 3GPP access from the UE to stop receiving the disaster roaming service from the FPLMN in response to detecting a signal on non-3GPP access to receive the normal service at the UE. Further, the method includes deregistering, by the FPLMN, the UE to stop providing the disaster roaming service from the FPLMN in the wireless network.

Accordingly, the embodiments herein provide a UE for handling operations during a disaster condition in a wireless network. The UE includes a deregistration procedure controller communicatively coupled to a memory and a processor. The deregistration procedure controller is configured to detect a disaster condition in the wireless network and trigger a registration procedure with a FPLMN on a 3GPP access to receive the disaster roaming service in the wireless network and get registered for the disaster roaming service with the FPLMN. Further, the deregistration procedure controller is configured to detect a signal on a non-3GPP access to receive normal service. Further, the deregistration procedure controller is configured to trigger a deregistration procedure with the FPLMN on the 3GPP access to stop receiving the disaster roaming service from the FPLMN in response to detecting the signal on the non-3GPP access to receive the normal service.

Accordingly, the embodiments herein provide a FPLMN for handling operations during a disaster condition in a wireless network. The FPLMN includes a deregistration procedure controller communicatively coupled to a memory and a processor. The deregistration procedure controller is configured to receive a registration request on a 3GPP access from the UE to receive the disaster roaming service in the wireless network. Further, the deregistration procedure controller is configured to register the UE to provide the disaster roaming service from the FPLMN in the wireless network. Further, the deregistration procedure controller is configured to receive a deregistration request on the 3GPP access from the UE to stop receiving the disaster roaming service from the FPLMN in response to detecting a signal on non-3GPP access to receive the normal service at the UE. Further, the deregistration procedure controller is configured to deregister the UE to stop providing the disaster roaming service from the FPLMN in the wireless network.

Accordingly, the embodiments herein provide a method for handling a UE operations during a disaster condition in a wireless network. The method includes receiving, by the UE, a deregistration procedure triggered from a HPLMN, when the HPLMN determines that a disaster situation has ended for the PLMN with disaster condition which can be either VPLMN or the HPLMN and the UE is registered for a disaster roaming service. Further, the method includes performing, by the UE, at least one of moving to a deregistered state and deleting all PDU sessions based on the deregistration procedure. Further, the method includes triggering, by the UE, a PLMN selection procedure to select the HPLMN or a VPLMN and sending a registration request to receive a normal service.

Accordingly, the embodiments herein provide a method for handling a UE operations during a disaster condition in a wireless network. The method includes determining, by a HPLMN, that a disaster situation has ended for the PLMN with disaster condition which can be either VPLMN or the HPLMN. Further, the method includes initiating, by the HPLMN, a deregistration procedure with the UE in response to determining that the disaster situation has ended. Further, the method includes receiving, by the HPLMN or the VPLMN, a registration request, from the UE, to receive a normal service based on the deregistration procedure.

Accordingly, the embodiments herein provide a UE for handling the UE operations during a disaster condition in a wireless network. The UE includes a deregistration procedure controller communicatively coupled to a memory and a processor. The deregistration procedure controller is configured to receive a deregistration procedure triggered from a HPLMN, when the HPLMN determines that a disaster situation has ended and the UE is registered for a disaster roaming service. The deregistration procedure controller is configured to perform at least one of moving to a deregistered state and deleting all PDU sessions based on the deregistration procedure. The deregistration procedure controller is configured to trigger a PLMN selection procedure to select the HPLMN or a VPLMN and send a registration request to receive a normal service.

Accordingly, the embodiments herein provide a HPLMN a UE operations during a disaster situation in a wireless network. The HPLMN includes a deregistration procedure controller communicatively coupled to a memory and a processor. The deregistration procedure controller is configured to determine that a disaster situation has ended and initiate a deregistration procedure with the UE in response to determining that the disaster situation has ended. Further, the deregistration procedure controller receives a registration request, from the UE, to receive a normal service based on the deregistration procedure.

By providing the processing of the deregistration procedure of the user equipment for the disaster roaming service in the wireless network according to the present disclosure, abnormal charging can be prevented.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF THE DRAWINGS

The embodiments disclosed herein are illustrated in the accompanying drawings, throughout which like reference letters indicate corresponding parts in the various figures. The embodiments herein will be better understood from the following description with reference to the drawings, in which:

FIG. 5 is a flow chart illustrating a method, implemented by the FPLMN apparatus, for handling the deregistration procedure of the UE for the disaster roaming service in the wireless network, according to embodiments as disclosed herein;

DETAILED DESCRIPTION

Figure 1:
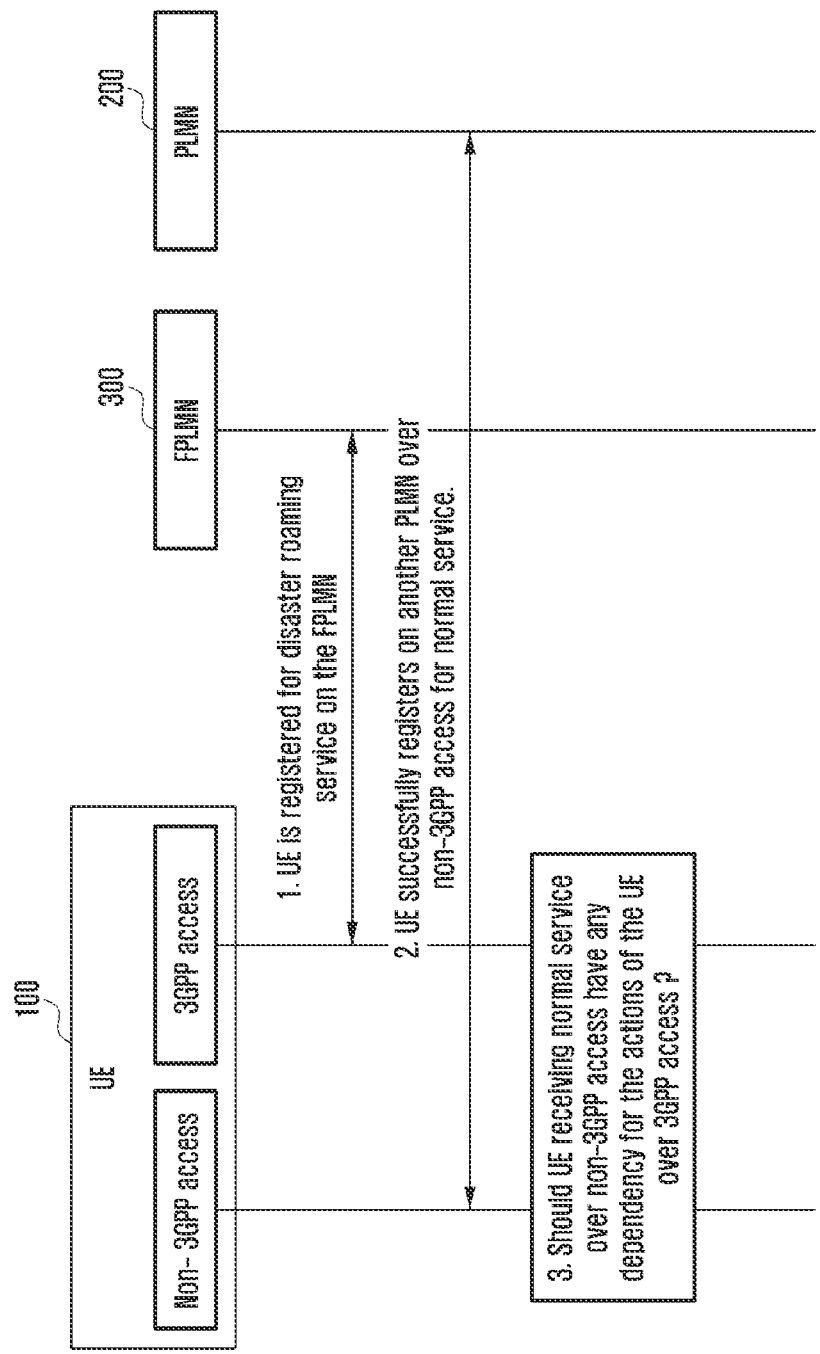
FIG. 1 and FIG. 2 illustrate a sequence diagram of a method a UE operations during a disaster situation in a wireless network, according to prior arts.
Figure 2:
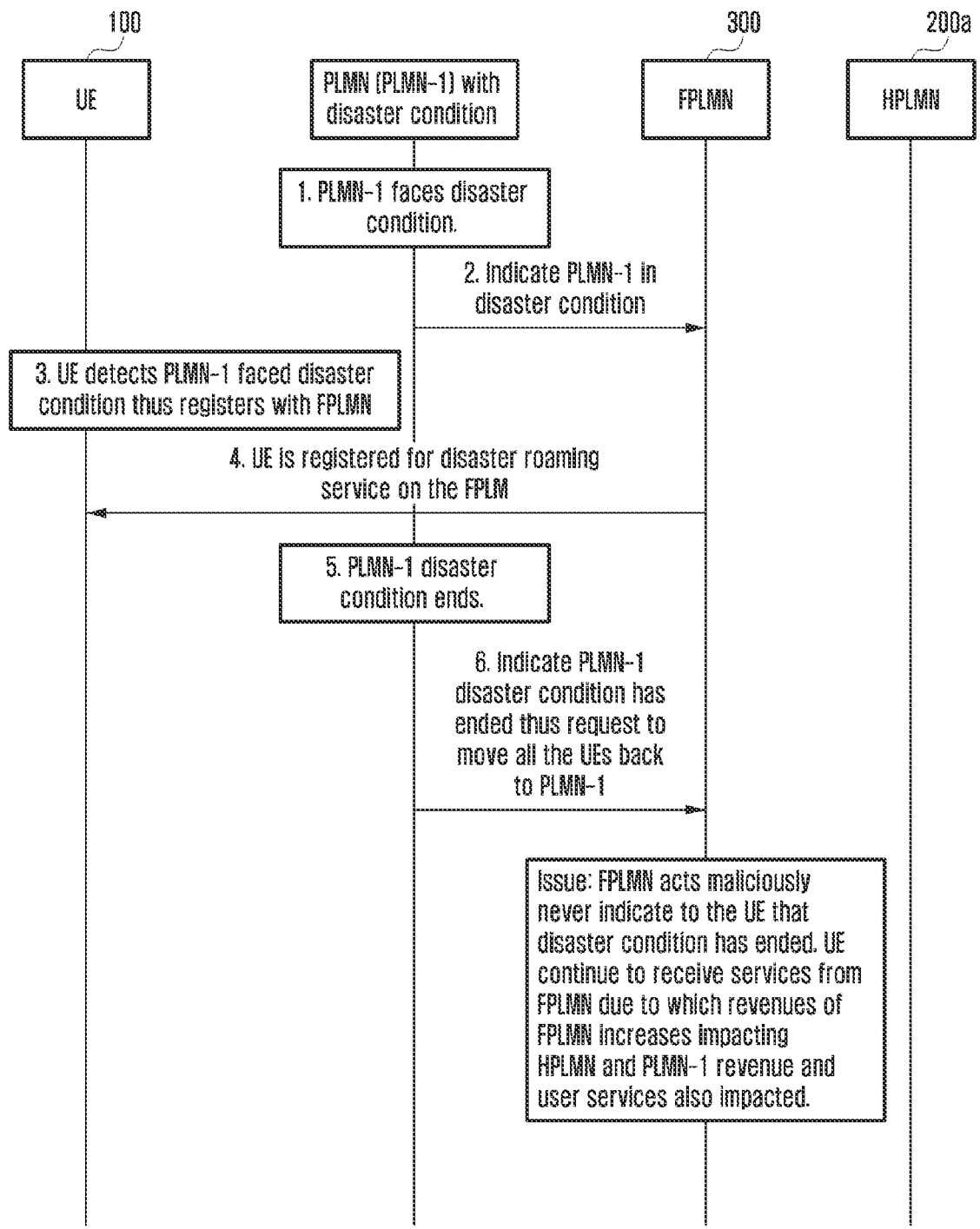

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The terms PLMN search and PLMN selection are used interchangeably in the patent disclosure.

The embodiments herein achieve a method a UE operations during a disaster situation in a wireless network. The method includes detecting, by the UE, a disaster condition in PLMN with disaster condition PLMN-D in the wireless network. Further, the method includes triggering, by the UE, a registration procedure with a FPLMN on a 3GPP access to receive the disaster roaming service in the wireless network and get registered for the disaster roaming service with the FPLMN. Further, the method includes detecting, by the UE, a signal on a non-3GPP access to receive normal service. Further, the method includes triggering, by the UE, a deregistration procedure with the FPLMN on the 3GPP access to stop receiving the disaster roaming service from the FPLMN in response to detecting the signal on the non-3GPP access to receive the normal service.

Referring now to the drawings, and more particularly to FIG. 3a to FIG. 8, where similar reference characters denote corresponding features consistently throughout the figures, there are shown at least one embodiment.

Figure 3A:
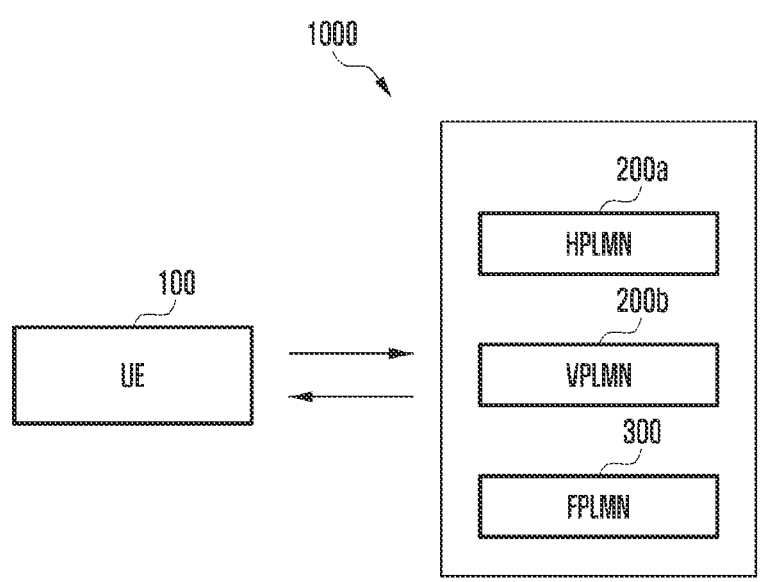
FIG. 3a illustrates an overview of a wireless network for handling a deregistration procedure for a disaster roaming service, according to embodiments as disclosed herein.

FIG. 3a illustrates an overview of the wireless network (1000) for handling the deregistration procedure for the disaster roaming service, according to embodiments as disclosed herein. In an embodiment, the wireless network (1000) includes the UE (100), a HPLMN (200a) (which consists of different network functions e.g., UDM entity), a VPLMN (200b) (e.g., AMF entity), and a FPLMN (300). The UE (100) can be, for example, but not limited to a laptop, a desktop computer, a notebook, a relay device, a Device-to-Device (D2D) device, a vehicle to everything (V2X) device, a smartphone, a tablet, an immersive device, and an internet of things (IoT) device. The wireless network (1000) can be, for example, but not limited to a 4G network, a 5G network, a 6G network, ORAN network or the like.

The UE (100) determines whether the disaster situation has been revoked or removed based on one or more of the following example triggers (this should be just taken as an example events):
 a) Broadcast bit of serving PLMN-A(FPLMN) does not indicate support for disaster inbound roaming services- or-PLMN-A(PLMN-A) has stopped broadcasting PLMN-D; or b) The UE (100) finds the non-3GPP access signal. The UE (100) is able get into connected mode over the PLMN. Optionally, this PLMN is not part of forbidden PLMN list or it is a HPLMN (200a) or it is an EHPLMN. Optionally, this step is true if the registration procedure is successful over non-3GPP access. Optionally, this step is true if the UE (100) is able to find a PLMN over non-3GPP access of the current serving country (determined over 3GPP access) i.e. UE (100) gets into connected mode over non-3GPP access; or In this embodiment, the term "stopped broadcasting disaster roaming support" should be read as the UE (100) has determined that PLMN is not supporting disaster inbound roaming service or disaster inbound roaming service with respect to a particular PLMN with disaster condition (PLMN-D) to which the UE (100) is registered.

When the UE (100) determines that the disaster situation has been revoked as described in this embodiment, if the UE (100) is in the connected mode and registered with PLMN-PLMN-A, the UE (100) shall perform deregistration procedure on 3GPP access (by indicating 3GPP access) or send any other NAS message to the network requesting the network to release the NAS signalling connection, and wait for NAS signalling connection release. Once the UE (100) is released to the IDLE state, the UE (100) shall perform the PLMN selection as described herein, following the priority order of "Priority order based on 23.122" or "Priority order based on 23.122 except RPLMN".

"Priority order based on 23.122" is defined as below (as in 4.4.3.1.1 Automatic Network Selection Mode Procedure). The MS selects and attempts registration on other PLMN/access technology combinations, if available and allowable, in the following order:
 1) RPLMN.
 i) Either the HPLMN (200a) (if the EHPLMN list is not present or is empty) or the highest priority EHPLMN that is available (if the EHPLMN list is present);
 ii) Each PLMN/access technology combination in the "User Controlled PLMN Selector with Access Technology" data file in the SIM (in priority order) (UPLMN list);
 iii) Each PLMN/access technology combination in the "Operator Controlled PLMN Selector with Access Technology" data file in the SIM (in priority order) or stored in the ME (in priority order) (OPLMN list);
 iv) Other PLMN/access technology combinations with received high quality signal in random order. The high quality signal is defined in the appropriate AS specification.
 v) Other PLMN/access technology combinations in order of decreasing signal quality.
 VI) FPLMN list PLMNs Priority order based on 23.122 except RPLMN is defined as below: Follow the same order "Priority order based on 23.122", but skip RPLMN.

If the network (HPLMN (200a) (e.g., UDM) or VPLMN (200b) (e.g., AMF (200)) determines that the disaster situation has ended in the PLMN-D or the HPLMN then Notification that the disaster condition is no longer applicable to the UEs (100) is notified to the UE (100) by one or more of below mechanisms:
 a. Initiate network-initiated deregistration procedure (for e.g., reject cause#11): In this case, the UE (100) moves to deregistered state, deletes all its PDU sessions and goes back to non-Forbidden PLMN (e.g., PLMN-D or any other higher priority PLMN providing normal service to the UE); or b. If the network wants to also preserve the PDU session i.e., to retain the UE (100) in the registered state:

i. The network can also indicate to the UE (100) with a Non access stratum (NAS) reject cause #13 (Roaming not allowed in this tracking area). Or cause #15 (No suitable cells in tracking area). The UE (100) will perform the PLMN selection the behaviour defined below for DL NAS TRANSPORT with SOR (Steering of Roaming) transparent container IE is also applicable here.

ii. Initiate Network-initiated NAS transport procedure (DL NAS TRANSPORT) with SOR Transport container IE. In this case, the PDU sessions are preserved when the UE (100) goes from forbidden PLMN to non-forbidden PLMN (PLMN-D) which will provide normal service. i.e., the UE (100) will remain in registered state. The network shall release the NAS signaling connection as early as possible.

The SOR transparent container IE: if the security check is successful (generally when provided by the HPLMN (200a)) when the ME receives a USAT REFRESH command qualifier (see 3GPP TS 31.111) of type "Steering of Roaming" it performs the procedure for steering of roaming in subclause 4.4.6 with an exception that if the UE (100) is in the automatic network selection mode, then the UE (100) shall wait until it moves to idle mode or 5GMM-CONNECTED mode with RRC inactive indication (see 3GPP TS 24.501) before attempting to obtain service on a higher priority PLMN; If the UE (100) is in the automatic network selection mode and the selected PLMN is a forbidden PLMN, then the UE (100) shall wait until it moves to idle mode or 5GMM-CONNECTED mode with RRC inactive indication (see 3GPP TS 24.501) before attempting to obtain service on the higher priority PLMN as specified in subclause 4.4.3.3 by acting as if timer T that controls periodic attempts has expired. If the UE (100) is configured with the SOR-CMCI or received the SOR-CMCI over a NI NAS signalling, the UE (100) shall apply the SOR-CMCI configuration run the timers as per the SOR-CMCI configuration and when last running Tsor-CM timer expires or stops the UE (100) shall perform deregistration procedure or local NAS signaling connection release to perform PLMN selection with Priority order based on 23.122 except RPLMN or PLMN selection with Priority order based on 23.122.

The SOR transparent container IE: the SOR security check can be unsuccessful when given by Forbidden PLMN (i.e., currently serving PLMN). The AMF (200) (or any other Network Functions) may also send Downlink (DL) NAS TRANSPORT message with SOR transparent container IE (because VPLMN AMF does not have the required security keys) a dummy MAC is inserted and in this case SOR security check failure will happen then the security check is not successful and the UE (100) is in the automatic network selection mode, then the UE (100) shall the wait until it moves to idle mode or 5GMM-CONNECTED mode with RRC inactive indication (see 3GPP TS 24.501) before attempting to obtain service on the higher priority PLMN (with Priority order based on 23.122 except RPLMN or PLMN selection with Priority order based on 23.122) by acting as if timer T that controls periodic attempts has expired, with an exception that the current PLMN is considered as lowest priority. If the selected PLMN is the VPLMN (200b) and the UE (100) has an established emergency PDU session then the UE shall attempt to perform the PLMN selection after the emergency PDU session is released. If SOR CMCI configuration is configured then the UE (100) will take into account the corresponding configuration and after Tsor-CM time expires or stops the UE will perform the above behavior.

If the network provides the DL NAS TRANSPORT with SOR TRANSPARENT container IE as defined above the network shall release the NAS signaling connection immediately so that the UE (100) can perform PLMN selection immediately and does not initiate the deregistration procedure.

If the UE (100) triggers IDLE to Connected mode transition by triggering registration procedure as part of registration accept message too network can provide SOR transparent container IE and above defined behavior is applicable.

The term before attempting to obtain service on a higher priority PLMN is performing PLMN selection with Priority order based on 23.122 except RPLMN or PLMN selection with Priority order based on 23.122. The network (HPLMN (200a) (e.g., UDM) or VPLMN (200b) (e.g., AMF) determines that disaster situation has ended in the PLMN-D or HPLMN (200a) when the UE (100) registers on the non-3GPP access (optionally over non forbidden PLMN) and they can initiate the procedure for the notification that Disaster Condition is no longer applicable to the UEs is notified to the UE (100) by one or more of the mechanisms described in this embodiment.

When the UE (100) determines that disaster condition has ended the UE (100) will remove the stored information on Disaster Condition from the UE's storage. The network can decide to preserve the PDU sessions based on the indication from the UE (100). The UE (100) can indicate for example in 5GMM capability that when the disaster condition ends i.e., Notification that Disaster Condition is no longer applicable to the UEs is notified to the UE (100) by using a mechanism:

a. to preserve the PDU session i.e., to remain in registered state, by executing a NAS procedure and indication to the UE (100) that disaster situation has ended without moving the UE (100) into deregistered state; the UE (100) will perform PLMN selection and when the UE (100) select the PLMN-D UE will perform registration procedure of type mobility registration or periodic registration but not initial registration or b. by the mechanism to not preserve the PDU sessions i.e., to make the UE (100) go to deregistered state and perform PLMN selection. i.e., by using network-initiated deregistration procedure (for e.g., cause 11). The UE (100) when it selects the new PLMN it will perform registration procedure with initial registration and re-establish all the PDU sessions again.

b) The above steps "a" and "b" defined behavior of the UE (100) is also applicable when the UE (100) has not indicted its preference. Based on the embodiments discussed in this invention.

The UE (100) detects the PLMN with the disaster condition (PLMN-D) in the wireless network (1000) and triggers the registration procedure with the FPLMN (300) on the 3GPP access to receive the disaster roaming service in the wireless network (1000). Further, the UE (100) detects the signal on the non-3GPP access to receive the normal service. Further, the UE (100) determines that the UE (100) is able to register to the PLMN on the non-3GPP access to receive the normal service based on the signal. Further, the UE (100)

triggers the registration procedure with the PLMN on the non-3GPP access to receive the normal service in the wireless network (1000).

In an embodiment, the FPLMN (300) provides services to the UE during the disaster condition in the wireless network (1000).

Further, the UE (100) determines that the registration procedure with the PLMN on the non-3GPP access to receive the normal service in the wireless network (1000) is successful.

Upon determining that the registration procedure with the PLMN on the non-3GPP access to receive the normal service in the wireless network (300) is successful, the UE (100) triggers the deregistration procedure with the FPLMN (300) on the 3GPP access to stop receiving the disaster roaming service from the FPLMN (300). Further, the FPLMN (300) receives a deregistration request on the 3GPP access from the UE (100) to stop receiving the disaster roaming service from the FPLMN (300). Further, the FPLMN (300) deregisters the UE (100) to stop providing the disaster roaming service from the FPLMN (300) in the wireless network (1000).

Figure 3B:
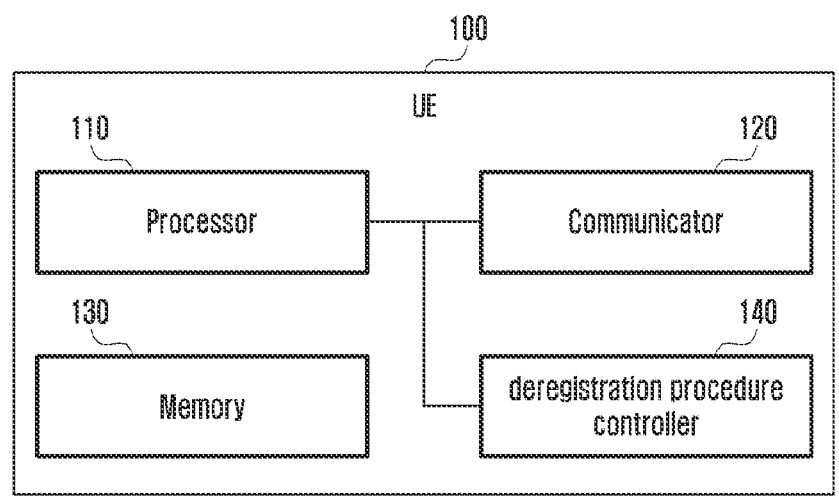
FIG. 3b shows various hardware components of a UE, according to embodiments as disclosed herein.

FIG. 3*b* shows various hardware components of the UE (100), according to embodiments as disclosed herein. In an embodiment, the UE (100) includes a processor (110), a communicator (120), a memory (130), and a deregistration procedure controller (140). The processor (110) is coupled with the communicator (120), the memory (130) and the deregistration procedure controller (140).

The deregistration procedure controller (140) detects the disaster condition in the wireless network (1000) and triggers the registration procedure with the FPLMN (300) on the 3GPP access to receive the disaster roaming service in the wireless network (1000) and get registered for the disaster roaming service with the FPLMN. Further, the deregistration procedure controller (140) detects the signal on the non-3GPP access to receive the normal service.

Further, the deregistration procedure controller (140) determines that the UE (100) is able to register to the PLMN on the non-3GPP access to receive the normal service based on the signal. Further, the deregistration procedure controller (140) triggers the registration procedure with the PLMN on the non-3GPP access to receive the normal service in the wireless network (1000). Further, the deregistration procedure controller (140) determines that the registration procedure with the PLMN on the non-3GPP access to receive the normal service in the wireless network (1000) is successful. Upon determining that the registration procedure with the PLMN on the non-3GPP access to receive the normal service in the wireless network (300) is successful, the deregistration procedure controller (140) triggers the deregistration procedure with the FPLMN (300) on the 3GPP access to stop receiving the disaster roaming service from the FPLMN (300).

The deregistration procedure controller (140) receives the deregistration procedure triggered from the HPLMN (200*a*), when the HPLMN (200*a*) determines that a disaster situation has ended and the UE (100) is registered for the disaster roaming service. Based on the deregistration procedure, the deregistration procedure controller (140) performs at least one of moving to the deregistered state and deleting all PDU sessions. The deregistration procedure controller (140) triggers the PLMN selection procedure to select the HPLMN (200*a*) or the VPLMN (200*b*) and sends the registration request to receive the normal service.

The deregistration procedure controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The deregistration procedure controller (140) is illustrated as a separate configuration for easy understanding of the features according to the present disclosure. However, all operations processed by the deregistration procedure controller (140) may be configured to be processed by the processor (110).

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 3*b* shows various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function in the UE (100).

Figure 3C:
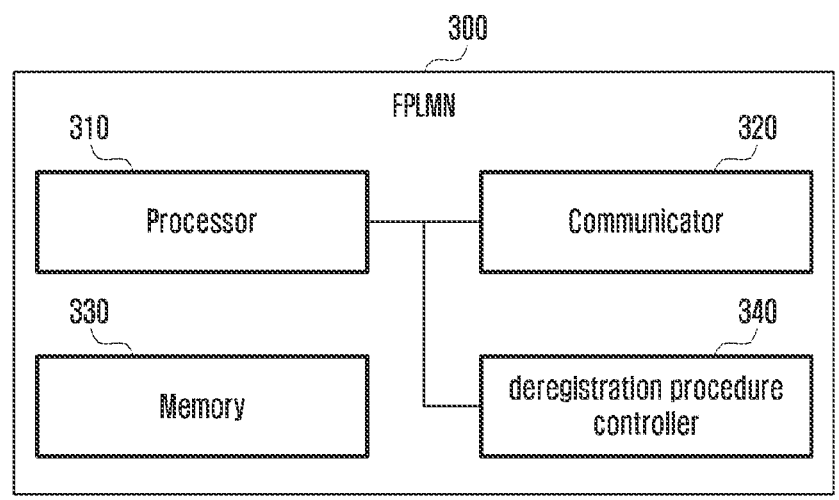
FIG. 3c shows various hardware components of a FPLMN, according to embodiments as disclosed herein.

FIG. 3*c* shows various hardware components of the FPLMN (300), according to embodiments as disclosed herein. In an embodiment, the FPLMN (300) includes a processor (310), a communicator (320), a memory (330), and a deregistration procedure controller (340). The processor (310) is coupled with the communicator (320), the memory (330) and the deregistration procedure controller (340).

The deregistration procedure controller (340) receives the registration request on the 3GPP access from the UE (100) to receive the disaster roaming service in the wireless network (1000). Further, the deregistration procedure controller (340) registers the UE (100) to provide the disaster roaming service from the FPLMN (300) in the wireless network (1000). Upon detecting the signal on non-3GPP access to receive the normal service at the UE (100), the deregistration procedure controller (340) receives the deregistration request on the 3GPP access from the UE (100) to stop receiving the disaster roaming service from the FPLMN (300). Further, the deregistration procedure controller (340) deregisters the UE (100) to stop providing the disaster roaming service from the FPLMN (300) in the wireless network (1000).

The deregistration procedure controller (340) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The deregistration procedure controller (340) is illustrated as a separate configuration for easy understanding of the features according to the present disclosure. However, all operations processed by the deregistration procedure controller (340) may be configured to be processed by the processor (110).

Further, the processor (310) is configured to execute instructions stored in the memory (330) and to perform various processes. The communicator (320) is configured for communicating internally between internal hardware components and with external devices via one or more networks. The memory (330) also stores instructions to be executed by the processor (310). The memory (330) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (330) may, in some examples, be considered a non-transitory storage medium. The term "non-transitory" may indicate that the storage medium is not embodied in a carrier wave or a propagated signal. However, the term "non-transitory" should not be interpreted that the memory (330) is non-movable. In certain examples, a non-transitory storage medium may store data that can, over time, change (e.g., in Random Access Memory (RAM) or cache).

Although the FIG. 3c shows various hardware components of the FPLMN (300) but it is to be understood that other embodiments are not limited thereon. In other embodiments, the FPLMN (300) may include less or more number of components. Further, the labels or names of the components are used only for illustrative purpose and does not limit the scope of the invention. One or more components can be combined together to perform same or substantially similar function in the FPLMN (300).

Figure 3D:
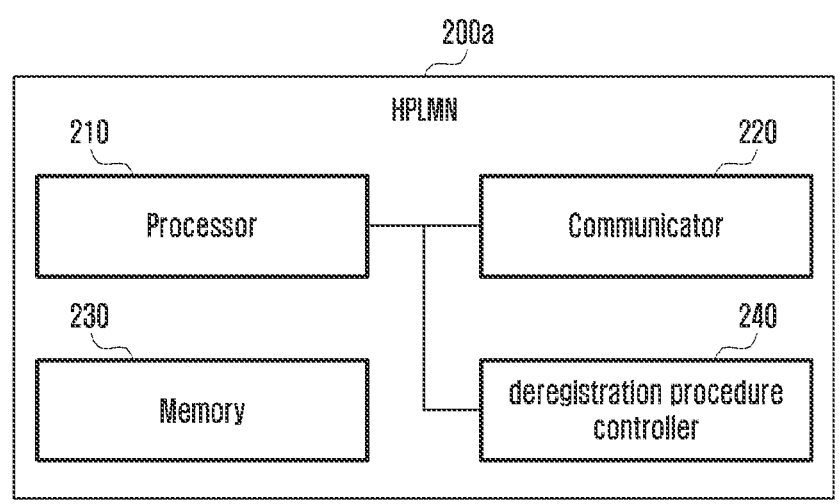
FIG. 3d shows various hardware components of a HPLMN, according to embodiments as disclosed herein.

FIG. 3d shows various hardware components of the HPLMN (200a), according to embodiments as disclosed herein. In an embodiment, the HPLMN (200a) includes a processor (210), a communicator (220), a memory (230), and a deregistration procedure controller (240). The processor (210) is coupled with the communicator (220), the memory (230) and the deregistration procedure controller (240). The deregistration procedure controller (240) determines that the disaster situation has ended. Based on the determination, the deregistration procedure controller (240) initiates the deregistration procedure with the UE (100) and receives the registration request, from the UE (100) to receive the normal service based on the deregistration procedure.

The deregistration procedure controller (240) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The deregistration procedure controller (240) is illustrated as a separate configuration for easy understanding of the features according to the present disclosure. However, all operations processed by the deregistration procedure controller (240) may be configured to be processed by the processor (110).

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although the FIG. 3d shows various hardware components of the HPLMN (200a) but it is to be understood that other embodiments are not limited thereon. In other embodiments, the HPLMN (200a) may include less or more number of components. Further, the labels or names of the components are used only for illustrative purpose and does not limit the scope of the invention. One or more components can be combined together to perform same or substantially similar function in the HPLMN (200a).

Figure 4A:
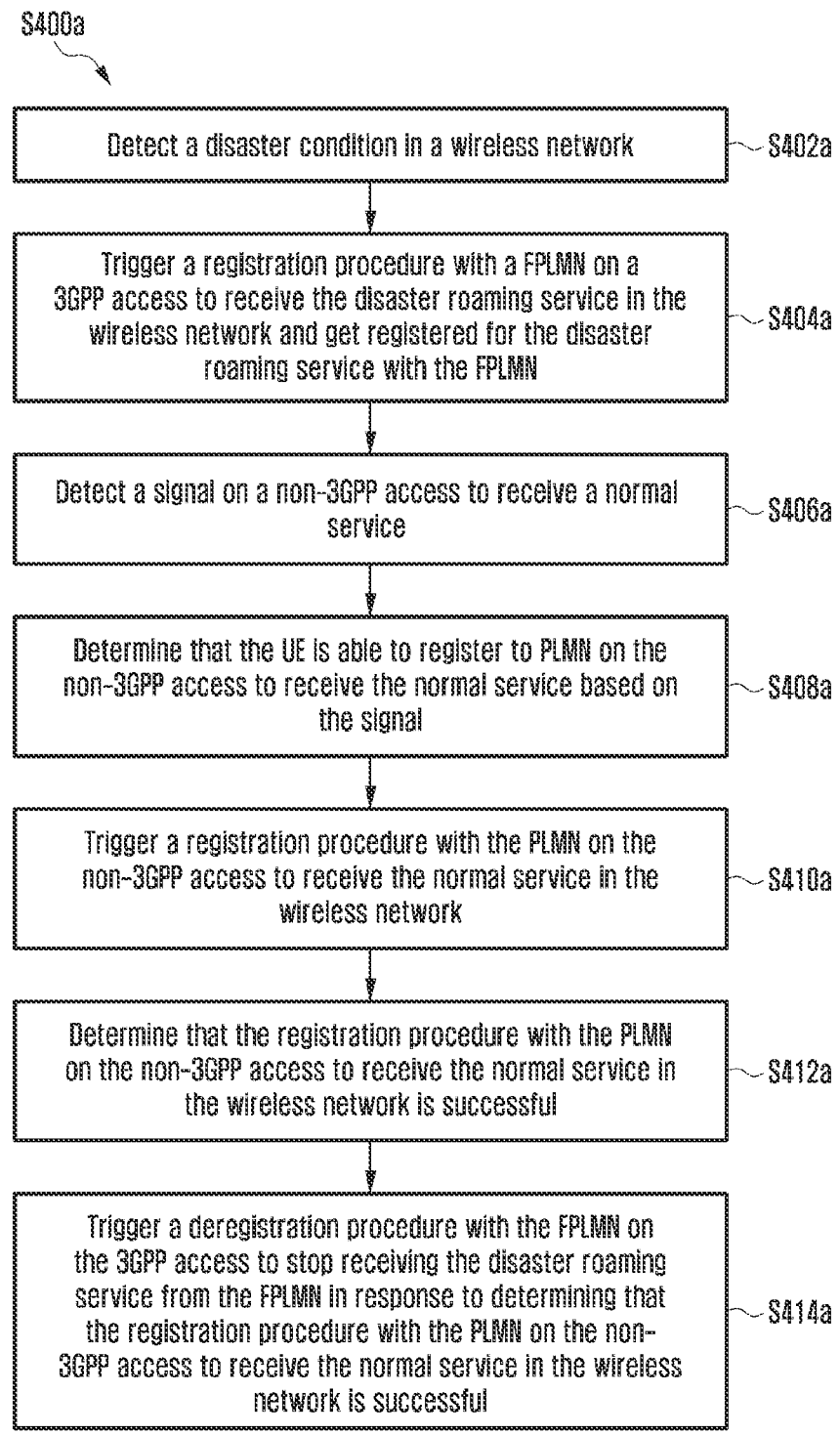
FIG. 4a and FIG. 4b are flow charts illustrating a method, implemented by the UE, for handling the deregistration procedure of the UE for the disaster roaming service in the wireless network, according to embodiments as disclosed herein.
Figure 4B:
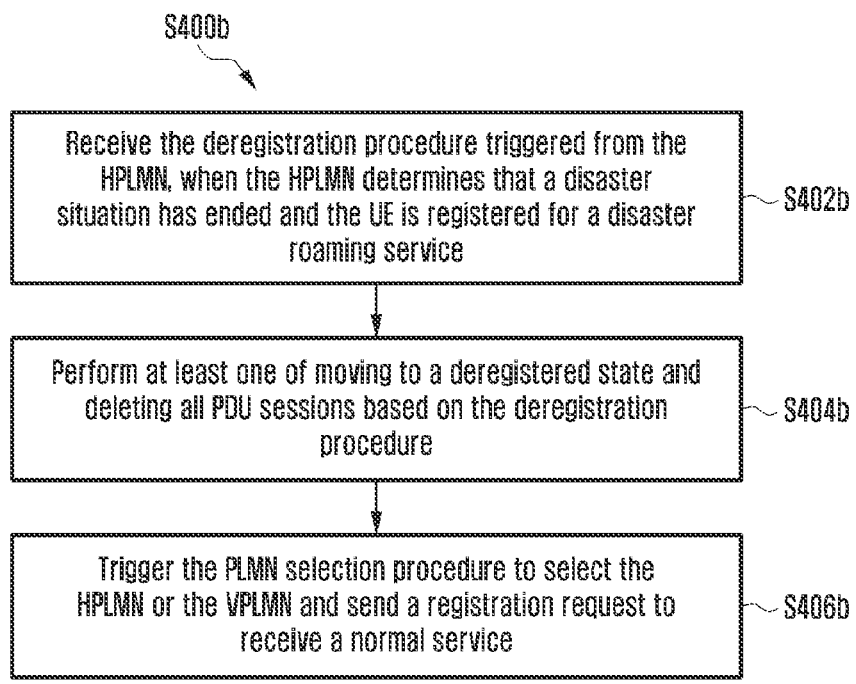

FIG. 4a and FIG. 4b are flow charts (S400a and 400b) illustrating a method, implemented by the UE (100), for handling the deregistration procedure of the UE (100) for the disaster roaming service in the wireless network (1000), according to embodiments as disclosed herein. Referring to the FIG. 4a, the operations (S402a-S414a) are handled by the deregistration procedure controller (140).

At S402a, the method includes detecting the disaster condition in the wireless network (1000). At S404a, the method includes triggering the registration procedure with the FPLMN (300) on the 3GPP access to receive the disaster roaming service in the wireless network (1000) and get registered for the disaster roaming service with the FPLMN (300). At S406a, the method includes detecting the signal on the non-3GPP access to receive the normal service. At S408a, the method includes determining that the UE (100) is able to register to the PLMN on the non-3GPP access to receive the normal service based on the signal.

At S410a, the method includes triggering the registration procedure with the PLMN on the non-3GPP access to receive the normal service in the wireless network (1000). At S412a, the method includes determining that the registration procedure with the PLMN on the non-3GPP access to receive the normal service in the wireless network (1000) is successful. At S414a, the method includes triggering the deregistration procedure with the FPLMN (300) on the 3GPP access to stop receiving the disaster roaming service from the FPLMN (300) in response to determining that the registration procedure with the PLMN on the non-3GPP access to receive the normal service in the wireless network (300) is successful.

Referring to the FIG. 4b, the operations (S402b-S406b) are handled by the deregistration procedure controller (140). At S402b, the method includes receiving the deregistration procedure triggered from the HPLMN (200a), when the HPLMN (200a) determines that the disaster situation has ended and the UE (100) is registered for the disaster roaming service. At S404b, the method includes performing at least one of moving to the deregistered state and deleting all PDU sessions based on the deregistration procedure. At S406b, the method includes triggering the PLMN selection procedure to select the HPLMN (200a) or the VPLMN (200b) and sending the registration request to receive the normal service.

FIG. 5 is a flow chart (S500) illustrating a method, implemented by the FPLMN (300), for handling the deregistration procedure of the UE (100) for the disaster roaming service in the wireless network (1000), according to embodiments as disclosed herein. The operations (S502-S508) are handled by the deregistration procedure controller (340).

At S502, the method includes receiving the registration request on the 3GPP access from the UE (100) to receive the disaster roaming service in the wireless network (1000). At S504, the method includes registering the UE (100) to provide the disaster roaming service from the FPLMN (300) in the wireless network (1000). At S506, the method includes receiving the deregistration request on the 3GPP access from the UE (100) to stop receiving the disaster roaming service from the FPLMN (300) in response to detecting a signal on non-3GPP access to receive the normal service at the UE (100). At S508, the method includes deregistering the UE (100) to stop providing the disaster roaming service from the FPLMN (300) in the wireless network (1000), deregistering the UE means sending deregistration accept message to the UE which is a response message to deregistration request message sent by the UE.

Figure 6:
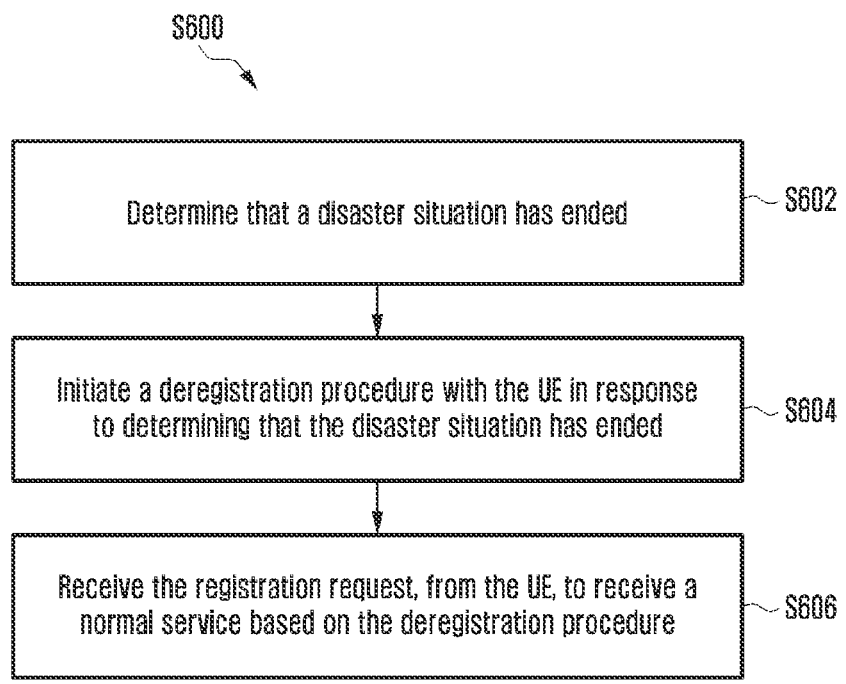
FIG. 6 is a flow chart illustrating a method, implemented by the HPLMN, for handling the deregistration procedure of the UE for the disaster roaming service in the wireless network, according to embodiments as disclosed herein.

FIG. 6 is a flow chart (S600) illustrating a method, implemented by the HPLMN (200a), for handling the deregistration procedure of the UE (100) for the disaster roaming service in the wireless network (1000), according to embodiments as disclosed herein. The operations (S602-S606) are handled by the deregistration procedure controller (240).

At S602, the method includes determining that the disaster situation has ended. At S604, the method includes initiating the deregistration procedure with the UE (100) in response to determining that the disaster situation has ended. At S606, the method includes receiving the registration request, from the UE, to receive a normal service based on the deregistration procedure.

Figure 7:
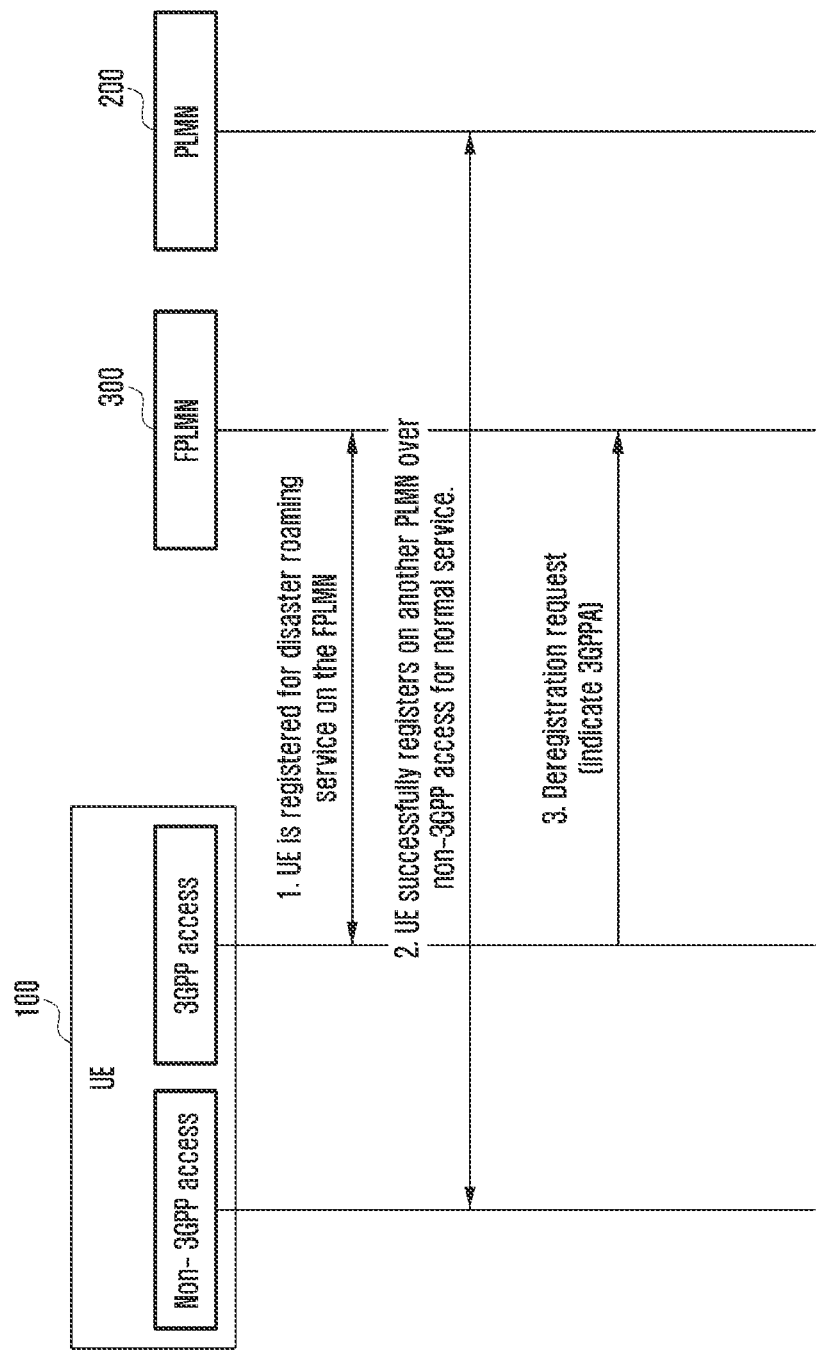
FIG. 7 and FIG. 8 illustrate a sequence diagram of a method for handling the deregistration procedure of the UE for the disaster roaming service in the wireless network, according to embodiments as disclosed herein.
Figure 8:
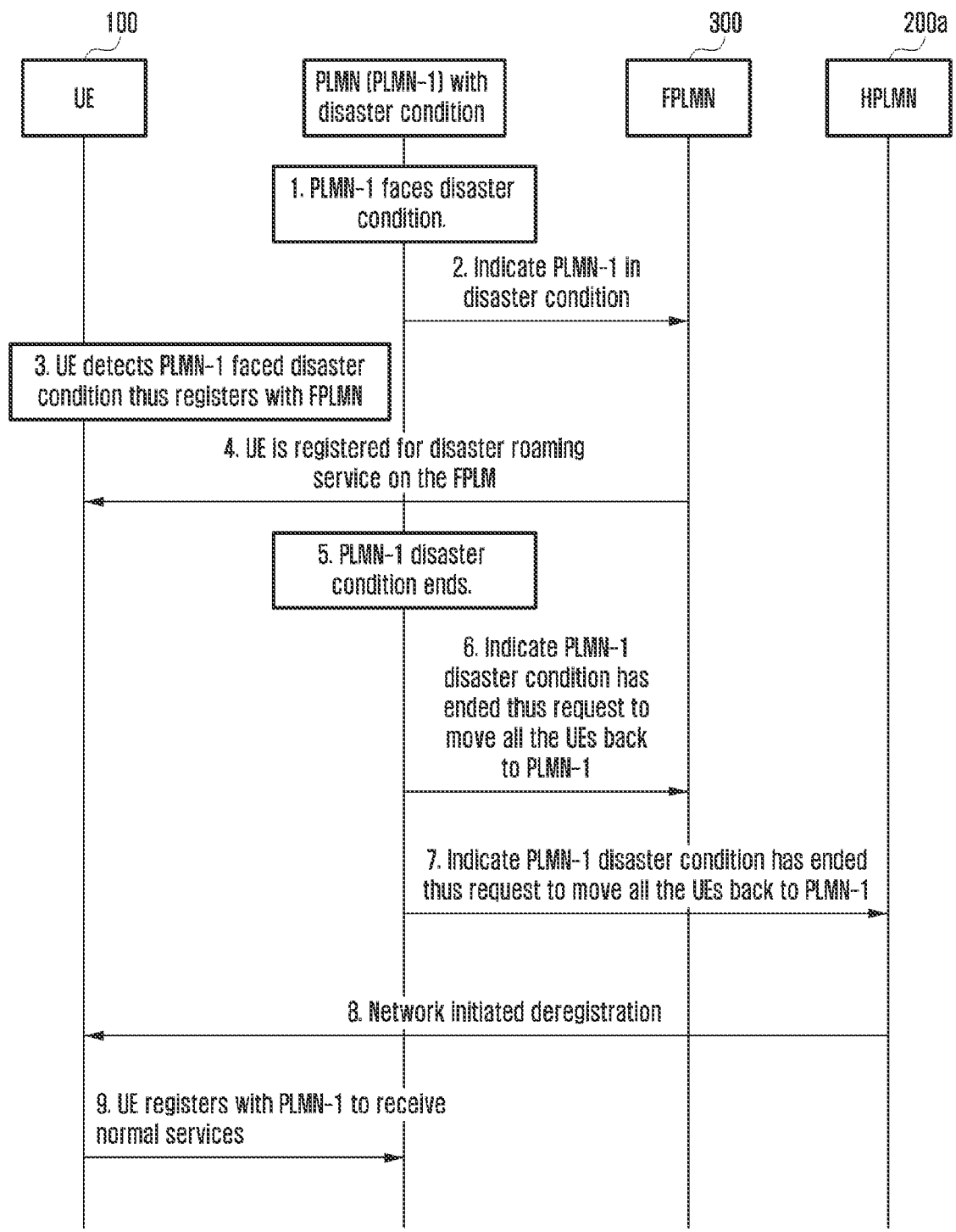

FIG. 7 and FIG. 8 illustrate a sequence diagram of a method for handling the deregistration procedure of the UE for the disaster roaming service in the wireless network (1000), according to embodiments as disclosed herein.

Referring to the FIG. 7, at 1, consider, the UE (100) is registered for the disaster roaming service on the 3GPP access over the FPLMN (300). At 2, the UE (100) finds the non-3GPP access signal and registers on the non-3GPP access to receive the normal services. Based on the proposed method, the UE (100) sends the deregistration request indicating the 3GPPA to the FPLMN (300).

Referring to the FIG. 8, at 1, the PLMN-1 faces the disaster condition. At 2, the PLMN-1 indicates that the PLMN-1 is in disaster condition to the FPLMN (300). The FPLMN (300) broadcasts that the PLMN-1 is in the disaster condition. At 3, after seeing the broadcasts from the FPLMN (300), the UE (100) detects that there is disaster condition on the PLMN-1. At 4, the UE (100) registers with the FPLMN to receive the disaster roaming service. At 5, after sometime, the PLMN-1 (which we call as VPLMN in this embodiment) disaster condition ends. At 6, the PLMN-1 indicates disaster condition has ended thus request to move all the UEs (PLMN-1s subscribers) back to PLMN-1 to FPLMN. According to the proposed method, at 7, the PLMN indicates that the PLMN-1 disaster condition has ended thus request to move all the UEs back to the PLMN-1. At 8, the HPLMN (200a) initiates the deregistration procedure with the UE (100). In response to the deregistration request message the UE performs PLMN selection procedure, selects the allowable PLMN in the area i.e. either the HPLMN or the VPLMN At 9, the UE (100) registers with the allowable PLMN like PLMN-1 to receive normal services. The allowable PLMN is a PLMN which is not part of FPLMN list in the UE.

The various actions, acts, blocks, steps, or the like in the flow charts (S400 and S500) may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the scope of the embodiments as described herein.

The present disclosure may be used when a disaster situation is released in a wireless communication system.

The invention claimed is:

1. A method performed by a user equipment (UE) in a wireless network, the method comprising:
    detecting, a disaster condition in the wireless network;
    performing, a registration procedure with a first PLMN on a 3rd Generation Partnership Project (3GPP) access to receive disaster roaming services, wherein the first PLMN is a forbidden PLMN (FPLMN);
    performing, a registration procedure with a second PLMN on a non-3GPP access to receive normal service; and
    in case that the registration procedure with the second PLMN is successful, performing, a deregistration procedure with the first PLMN on the 3GPP access.

2. The method of claim 1, wherein the deregistration procedure is performed while the disaster condition has not ended.

3. The method of claim 1, wherein the first PLMN provides services to the UE during the disaster condition in the wireless network.

4. The method of claim 1, wherein the deregistration procedure with the first PLMN on the 3GPP access includes releasing all PDU sessions established.

5. The method of claim 1, wherein the deregistration procedure with the first PLMN on the 3GPP access is performed based on a deregistration trigger received from a Home PLMN (HPLMN).

6. A user equipment (UE) in a wireless network, the UE comprising:
    a communicator; and
    a controller coupled with the communicator and configured to:
        detect a disaster condition in the wireless network,
        perform a registration procedure with a first PLMN on a 3rd Generation Partnership Project (3GPP) access to receive disaster roaming services, wherein the first PLMN is a forbidden PLMN (FPLMN), perform a registration procedure with a second PLMN on a non-3GPP access to receive a normal service, and in case that the registration procedure with the second PLMN is successful, perform a deregistration procedure with the first PLMN on the 3GPP access.

7. The UE of claim 6, wherein the deregistration procedure is performed while the disaster condition has not ended.

8. The UE of claim 6, wherein the first PLMN provides services to the UE during the disaster condition in the wireless network.

9. The UE of claim 6, wherein the deregistration procedure with the first PLMN on the 3GPP access includes releasing all PDU sessions established.

10. The UE of claim 6, wherein the deregistration procedure with the first PLMN on the 3GPP access is performed based on a deregistration trigger received from a Home PLMN (HPLMN).

11. A method performed by a first PLMN in a wireless network, the method comprising:

receiving, from a user equipment (UE), a registration request on a 3GPP access, wherein the first PLMN is a forbidden PLMN (FPLMN) for the UE;

registering, the UE to provide a disaster roaming service from the first PLMN;

receiving, from the UE, a deregistration request on the 3GPP access, in case that a registration procedure between the UE and a second PLMN on a non-3GPP access for normal service is performed successfully; and deregistering the UE from the first PLMN.

12. The method of claim 11, wherein the deregistering the UE includes releasing all PDU sessions established.

* * * * *